United States Patent
Li et al.

(10) Patent No.: US 12,185,196 B2
(45) Date of Patent: Dec. 31, 2024

(54) METHOD, SYSTEM AND APPARATUS OF MULTICAST COMMUNICATION

(71) Applicant: ZTE CORPORATION, Guangdong (CN)

(72) Inventors: Zhendong Li, Shenzhen (CN); Shuang Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 446 days.

(21) Appl. No.: 17/706,125

(22) Filed: Mar. 28, 2022

(65) Prior Publication Data

US 2022/0225059 A1    Jul. 14, 2022

Related U.S. Application Data

(63) Continuation of application No. PCT/CN2019/109282, filed on Sep. 30, 2019.

(51) Int. Cl.
*H04W 4/08*   (2009.01)
*H04L 12/18*   (2006.01)

(52) U.S. Cl.
CPC ............. *H04W 4/08* (2013.01); *H04L 12/189* (2013.01)

(58) Field of Classification Search
CPC ..................................................... H04W 4/08
See application file for complete search history.

(56) References Cited

U.S. PATENT DOCUMENTS

2019/0335002 A1* 10/2019 Bogineni ................ H04W 8/22

FOREIGN PATENT DOCUMENTS

| CN | 109769150 A |   | 5/2019 |            |
|----|-------------|---|--------|------------|
| CN | 110121155 A |   | 8/2019 |            |
| CN | 110247779 A | * | 9/2019 | H04L 12/185 |
| CN | 110290478 A |   | 9/2019 |            |

OTHER PUBLICATIONS

Huawei et al.: "Update to Solution 15" 3GPP TSG-SA WG2 Meeting #129Bis S2-1812414 Nov. 30, 2018(Nov. 30, 2018) the whole document.
International Search Report and Written Opinion for PCT Appl. No. PCT/CN2019/109282 mailed Jul. 3, 2020.
(Continued)

*Primary Examiner* — Erika A Washington
(74) *Attorney, Agent, or Firm* — Foley & Lardner LLP

(57) ABSTRACT

A system and method for enabling one to many multicast communication in a 5G wireless network are disclosed herein. In one embodiment, an example wireless communication method to enable multicast operation includes: querying, by a first wireless communication node, a second wireless communication node to receive one or more multicast group member information. The method further includes receiving, by the first wireless communication node, the one or more multicast group member information from the second wireless communication node, and configuring, by the first wireless communication node, one or more third wireless communication nodes with the one or more multicast group member information received from the second wireless communication node, to set up rules for multicast packet forwarding at the one or more third wireless communication nodes.

20 Claims, 5 Drawing Sheets

(56) References Cited

OTHER PUBLICATIONS

Nokia et al.: "Correcting AMF behaviour for Service Request that is not integrity protected"; SA WG2 Meeting #132 S2-1903668; Apr. 12, 2019(Apr. 12, 2019) section 4.5.1.
First CN Office Action on CN 2019801025948 dated May 12, 2023 (9 pages, including English translation).
Extended European Search Report for EP Appl. No. 19947472.7, dated Sep. 7, 2022.
Huawei et al., "Update of 5G LAN-type service feature description" #GPP TSG-SA2 Meeting #134, S2-1907606, Jun. 24, 2019, Sapporo, Japan (4 pages).
Nokia et al., "Correcting AMF behaviour for Service Request that is not integrity protected" Sa WG2 Meeting #132, S2-1903668, Apr. 8, 2019, Xi'an, PRC (376 pages).

* cited by examiner

METHOD, SYSTEM AND APPARATUS OF MULTICAST COMMUNICATION

CROSS-REFERENCE TO RELATED APPLICATIONS

This application claims the benefit of priority under 35 U.S.C. § 120 as a continuation of PCT Patent Application No. PCT/CN2019/109282, filed on Sep. 30, 2019, the disclosure of which is incorporated herein by reference in its entirety.

TECHNICAL FIELD

The disclosure relates generally to enabling one to many multicast communication in a 5G wireless network. In particular, the disclosure relates to methods of multicast group management in the 5G Core (5GC) network.

BACKGROUND

In the 3GPP Release 16 specifications, the 5G wireless network supports the 5G virtual network (VN) group communication. 5G VN group communication includes one to one communication, and also one to many communication. One to one communication supports forwarding of unicast traffic between two User Equipment (UEs) within a 5G VN, or between a UE and a device on the Data Network (DN). One to many communication supports forwarding of broadcast traffic from one UE (or device on the DN) to all other UEs (or device on the DN) within a 5G VN, or multicast traffic from one UE (or device on the DN) to some UEs (or device on the DN) within a 5G VN.

However, currently there is no support for one to many multicast communication in 3GPP Release 16 specifications. There is a need to find a solution to resolve the issue of supporting one to many 5G VN multicast communication.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments is made while remaining within the scope of this disclosure.

In one embodiment, an example wireless communication method to enable multicast operation includes: querying, by a first wireless communication node, a second wireless communication node to receive one or more multicast group member information. The method further includes receiving, by the first wireless communication node, the one or more multicast group member information from the second wireless communication node, and configuring, by the first wireless communication node, one or more third wireless communication nodes with the one or more multicast group member information received from the second wireless communication node, to set up rules for multicast packet forwarding at the one or more third wireless communication nodes.

In another embodiment, a wireless communication method to provision multicast operation in a wireless network, includes: receiving, by the second wireless communication node, a provisioning message from a fourth wireless communication node wherein the provisioning message includes the multicast group member information, and provisioning, by the second wireless communication node, the multicast group member information into a data repository.

In yet another embodiment, a wireless communication method to provision multicast operation in a wireless network includes: receiving, by the fourth wireless communication node, a provisioning message from a fifth wireless communication node wherein the provisioning message includes the multicast group member information; and provisioning, by the fourth wireless communication node, the multicast group member information into a data repository.

In yet another embodiment, a method for enabling multicast operation in a wireless network, includes: receiving, by a first wireless communication node, a group management protocol message from a second wireless communication node, and forwarding, by the first wireless communication node, the group management protocol message to a third wireless communication node.

The above and other aspects and their implementations are described in greater detail in the drawings, the descriptions, and the claims.

BRIEF DESCRIPTION OF THE DRAWINGS

Various example embodiments of the present disclosure are described in detail below with reference to the following figures or drawings. The drawings are provided for purposes of illustration only and merely depict example embodiments of the present disclosure to facilitate the reader's understanding of the present disclosure. Therefore, the drawings should not be considered limiting of the breadth, scope, or applicability of the present disclosure. It should be noted that for clarity and ease of illustration, these drawings are not necessarily drawn to scale. In the drawings, similar symbols typically identify similar components, unless dictated otherwise.

FIG. 4B depicts how the Session Management Function (SMF) obtains the multicast group information and configures the User Plane Function (UPF).

DETAILED DESCRIPTION OF EXAMPLE EMBODIMENTS

Overview of Multicast Operation in 5G Network

Various example embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein is made without departing from the scope of the present disclosure. Thus, the present disclosure is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes is re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In the following description, the terms "5G wireless network" and "mobile network" are used interchangeably. Also, the terms "DN" and "a device in the DN" are used interchangeably.

Figure 1:
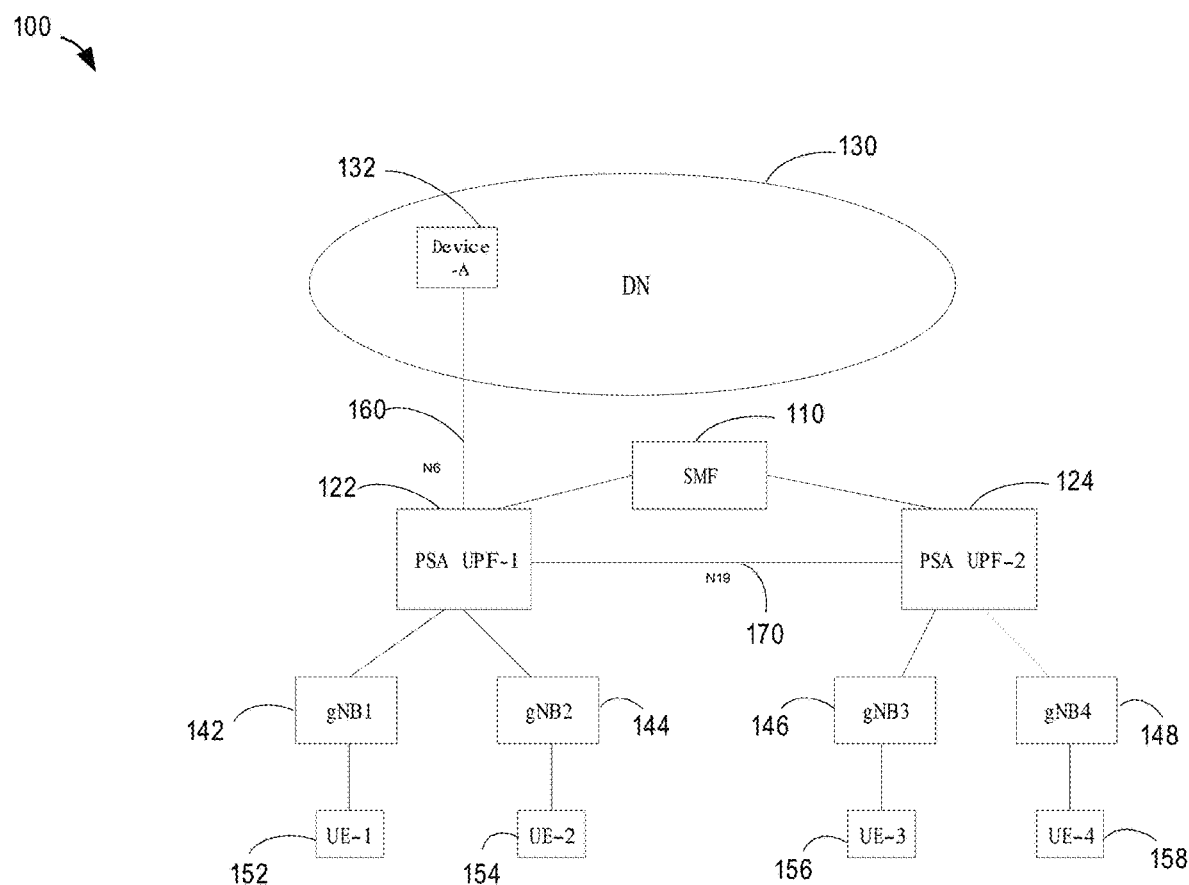
FIG. 1 illustrates an example 5G VN topology in which techniques and other aspects disclosed herein may be implemented, in accordance with an embodiment of the present disclosure.

Referring to FIG. 1, an example 5G VN network 100 is illustrated for a 5G system. The VN group consists of UE-1 (reference numeral 152), UE-2 (154), UE-3 (156) and UE-4 (158) in multiple Next Generation Base Stations (gNBs 142, 144, 146 and 148) belonging to 5G Radio Access Network (RAN), as well as a Device-A (132) in the DN (130). The VN group consisting of the group members and related Protocol Data Unit (PDU) sessions and 5GC network entities comprise a 5G VN network. The UE-1 152 and UE-2 154 establish the PDU session to UPF-1 122, which is the PDU session anchor (PSA) for UE-1 152 and UE-2 154 in the example embodiment. The UE-3 156 and UE-4 158 establish the PDU session to UPF-2 124, which is the PSA for UE-3 156 and UE-4 158 in the example. A dedicated SMF 110 is responsible for configuring all the PDU sessions for communication between members of a certain 5G VN group. The SMF 110 establishes N19 interface 170 between PSA UPF-1 and PSA UPF-2 for VN group N19 forwarding. Also shown in FIG. 1 is a N6 interface 160 between the Device-A 132 and the UPF-1 122. In the following disclosure and figures, the example topology of FIG. 1 shall be used to illustrate examples of operation of any member of 5G VN group sending data to any other member of VN group (unicast), or all the other members of VN group (broadcast), or subset of all the other member of VN group (multicast).

Figure 2:
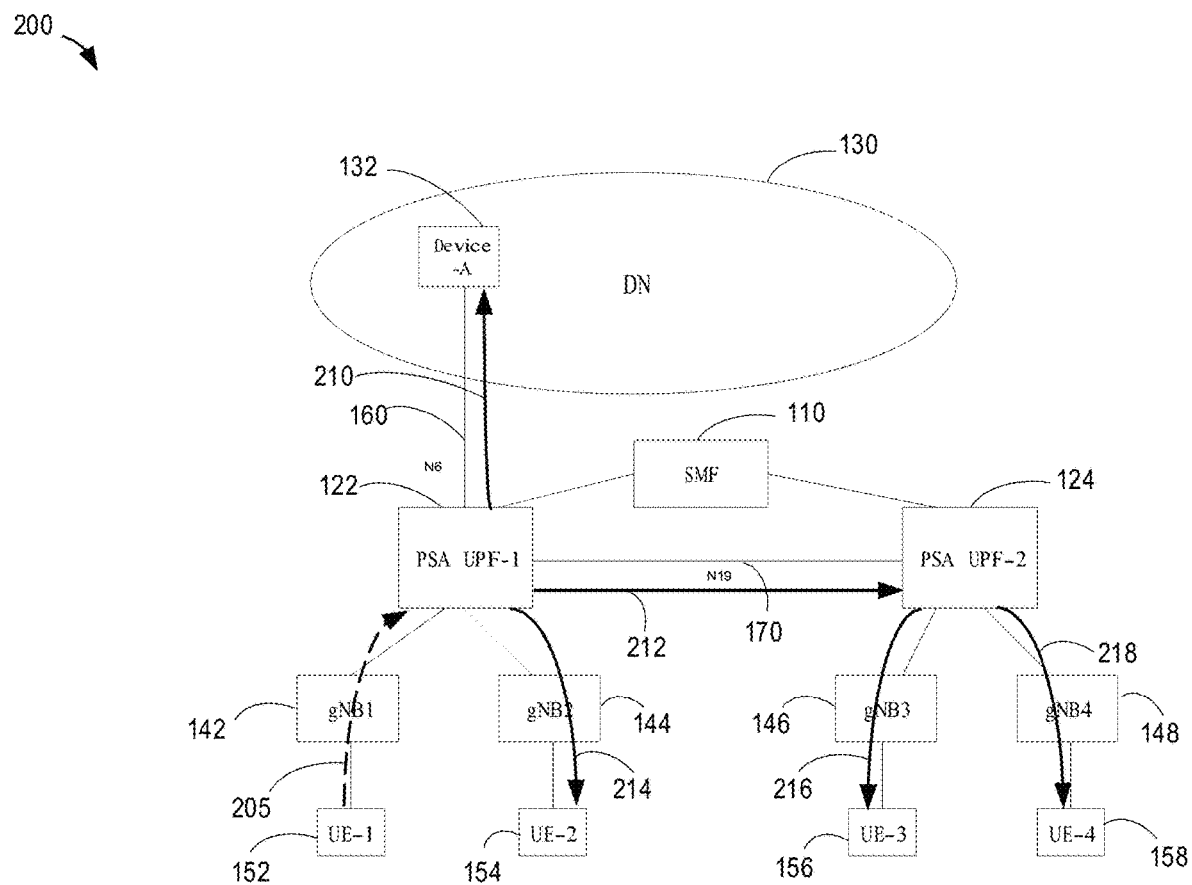
FIG. 2 illustrates the operation of one to many broadcast communication in the example 5G VN network of FIG. 1, in accordance with an embodiment of the present disclosure.

Referring now to FIG. 2, an example of 5G VN broadcast communication is shown to differentiate it from multicast communication described later. The UE-1 sends VN group broadcast traffic by sending the packet 205 with a broadcast destination address. The data is first sent to PSA UPF-1 via PDU session of UE-1. To enable broadcast communication, it is assumed that the SMF has provisioned PSA UPF-1 and PSA UPF-2 with related packet detection rule (PDR) and forwarding action rule (FAR) for 5G VN broadcast forwarding corresponding to the broadcast destination address used by UE-1. Actions by the PSA UPF-1 include: send packet to Device-A via N6 interface 210 (so called N6 forwarding), send packet to UE-2 via UE-2 PDU session 214 (so called local switch), and send packet to PSA UPF-2 via N19 interface 212 (so called N19 forwarding). Actions by the PSA UPF-2 include: send packet to UE-3 via UE-3 PDU session 216, and send packet to UE-4 via UE-4 PDU session 218. Thus, to achieve broadcast communication, the PSA UPF-1 sends three (3) copies of received packet to interfaces N6, N19 and UE-2 separately, the PSA UPF-2 sends two (2) copies of received packet to UE-3 and UE-4 separately.

In the case of 5G VN unicast communication, the UE sends VN group unicast traffic by sending the packet with unicast destination address (i.e. remote address). The data is first sent to PSA UPF via PDU session of UE. The PSA UPF may send via N6 interface (if the remote end is in the DN), or via N19 interface (if the remote end is under the peer UPF), or via local switch (if the remote end is under the same PSA UPF).

Figure 3:
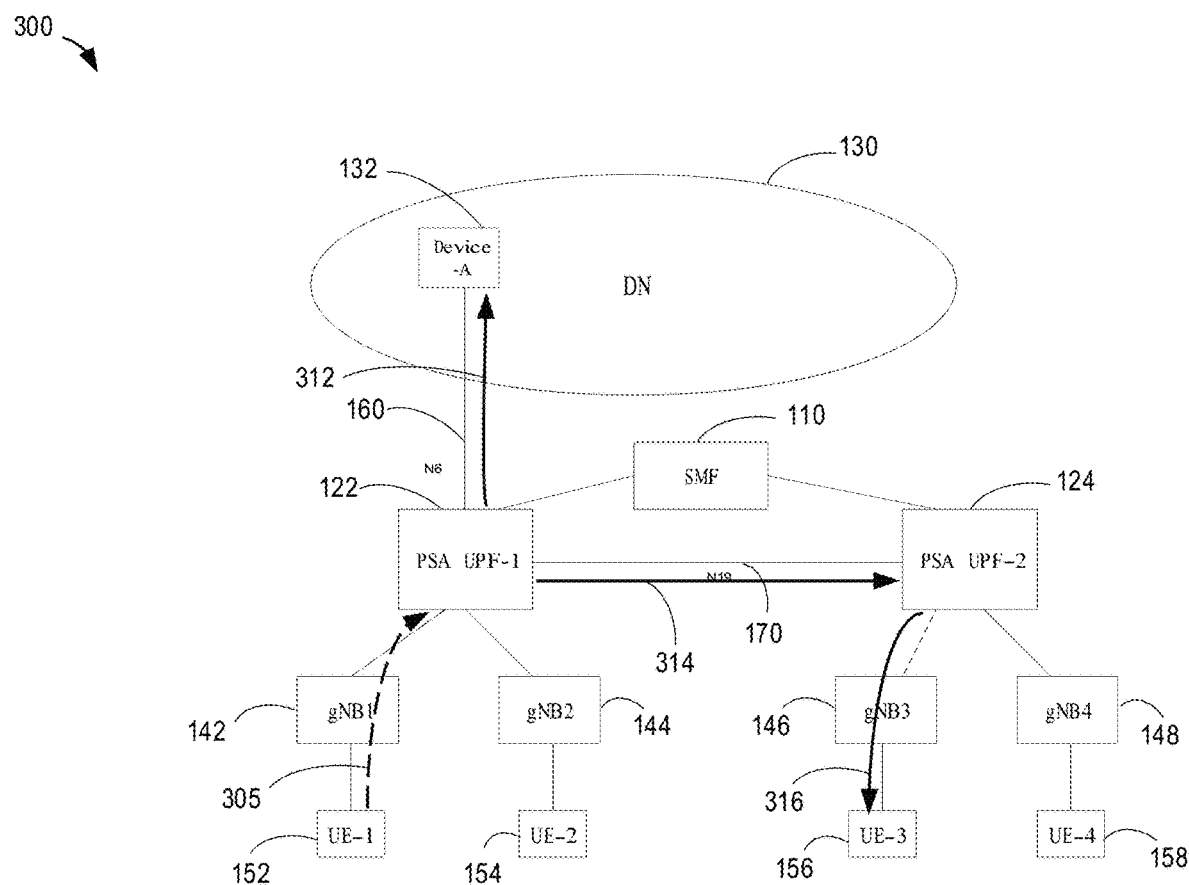
FIG. 3 illustrates the operation of one to many multicast communication in the example 5G VN network of FIG. 1 to contrast multicast communication from broadcast communication depicted in FIG. 2, in accordance with an embodiment of the present disclosure.

Referring to FIG. 3, in the example case of 5G VN multicast, a particular multicast group may be a subset of the whole 5G VN group member. For example, in FIG. 3, the Virtual group member are UE-1, UE-3 and UE-4 in 5G network and Device-A in the DN. The UE-1, UE-3 and Device-A are the member of multicast group A (UE-1, UE-3, Device-A), the UE-3 and Device-A are the member of multicast group B (UE-3, Device-A), the UE-1 and UE-4 are the member of multicast group C (UE-1, UE-4). Every multicast group is identified by a particular multicast address. If the UE-1 send the data packet 305 which destination address is set to multicast group A address, the packet will be send to UE-3 via N19 interface 314 and sent to Device-A via N6 interface 312. To enable support for one to many multicast communication in the 5G wireless network, some means have to be provided for the network know who the members of each multicast group are (which is associated with a unique multicast address), and where in the 5G network the multicast member is in, so that the multicast packet can be forwarded to each member using the correct interface and service (i.e., message).

Embodiment #1

In a fixed network (as opposed to a 5G wireless network or a mobile network), devices typically support Internet Group Management Protocol (IGMP) or Multicast Listener Discovery (MLD) for multicast communication. In a mobile network (e.g. 5G system), the IGMP or MLD are typically not supported due to UE capability or due to network complexity. Thus, in the first embodiment of the 5G network of the present disclosure, neither the UE nor the 5G network provides inherent support for multicast group management protocols.

Figure 4A:
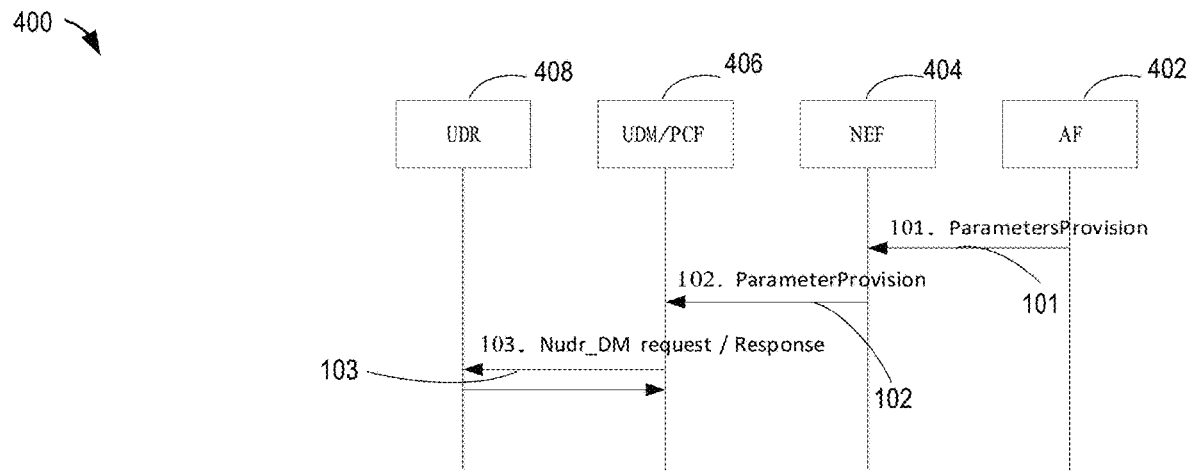
FIG. 4A illustrates a message sequence diagram of an example method to provision one to many multicast communication in the various nodes of the 5G Core network in the example of FIG. 1, according to yet another example embodiment of the present disclosure.

Referring now to FIG. 4A, in one embodiment of the present disclosure, support is provided for multicast communication by provisioning the multicast group information from the Application Function (AF) 402 to the Network Exposure Function (NEF) 404. The multicast group information includes 5G VN group ID, one or more multicast group member identities, and the multicast address.

The NEF provision group member information to Unified Data Management (UDM) 406, by using a modified version of the Nudm_ParameterProvision service that includes the multicast group information. The 5G VN group ID can be the external group ID or internal group ID (if NEF 404 has the mapping between these two IDs. In some embodiment, the NEF 404 checks with UDM 406 for translating the external group ID to internal Group ID), the group member identity could be GPSI, multicast address can be IP multicast address or MAC multicast address.

In one embodiment, the NEF 404 provisions group member information to the Packet Control Function (PCF) 406, with a new service being required for PCF 406. The UDM or PCF then provision group member information to Unified Data Repository (UDR) 408. The UDR is a repository of subscriber information (or subscription information, or policy information, among other data) and can be used to service a number of network functions. In some embodiments, the NEF 404 provisions group member information to UDR 408 directly. To UDR 408, the group member identity could be GPSI or SUPI (Subscription Permanent Identifier). The translation form GPSI to SUPI may be performed by UDM or PCF 406.

The SMF 450 obtains the multicast group member information from UDR 408. The SMF 450 analyzes the multicast group member information to configure all the involved UPFs 452 with related PDR and FAR. The involved UPFs are the ones that act as PDU session anchors for the one or more UEs and Devices in the DN that are mentioned in the multicast group member information. The message sequence diagram of FIG. 4A depicts the following steps:

At step 101, the AF 402 provision the multicast group information to NEF 404. The multicast group information includes 5G VN group ID, one or more multicast group member identities, and the multicast address.

At step 102, the NEF 404 provision the multicast group information to UDM or PCF 406.

At step 103, the UDM or PCF 406 provision the multicast group information to UDR 408. Note: In one embodiment, the NEF 404 provisions the multicast group information to UDR 408 directly.

Figure 4B:
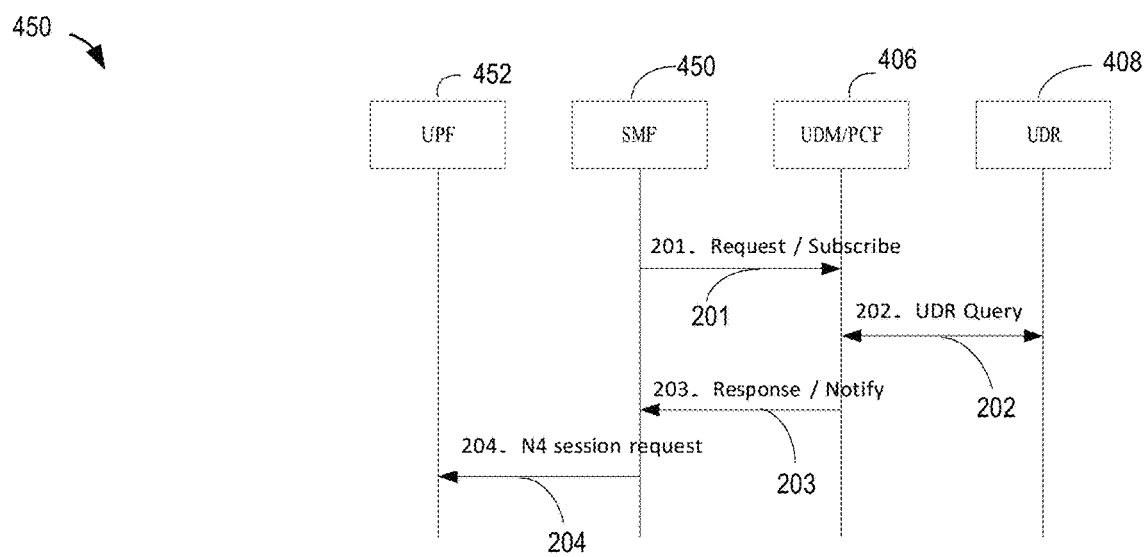
FIG. 4B depicts a message sequence diagram of how various nodes of the 5G Core network interact with each other to utilize the provisioning of FIG. 4A to enable one to many multicast communication in the 5G network, according to an example embodiment of the present disclosure. In particular.

Now referring to FIG. 4B, a message sequence diagram is depicted regarding how the SMF 450 obtains the multicast group member information from the UDR 408, and configures all the involved UPFs 452 to enable multicast communication in the 5G Core network. The steps depicted in the message sequence diagram are:

At step 201, the SMF 450 either requests or subscribes for the multicast group member information from the UDM or PCF 406. If SMF 450 uses the request/response mechanism, the API/message is Nudm_SDM_Get, whereas if SMF 450 uses the subscribe/notify mechanism, the API/message is Nudm_SDM_subscribe. If SMF 450 uses the PCF 406 to receive the multicast group member information, then a new PCF service has to be used for that purpose.

At step 202, the UDM or PCF 406 query the UDR 408 for the multicast group information. The multicast group information includes 5G VN group ID, one or more multicast group member identities, and the multicast address. The service/messages used at this step is Nudr_DM_query service.

At step 203, the UDM or PCF 406 either send a response message or notify the SMF 450 with multicast group member information. If SMF 450 uses the request/response mechanism, the API/message is output of Nudm_SDM_Get. On the other hand, if SMF 450 uses the subscribe/notify mechanism, the API/message is Nudm_SDM_notification.

At step 204, the SMF configure the involved UPF with related PDR and FAR. The involved UPF(s) includes the UPF which is involved in the related multicast group data forwarding using the N4 session Establishment/Modification request.

Embodiment #2

In another embodiment, the UE and 5G network support the Multicast group management protocol, while the 5G network does not support Multicast Routing protocol. In such an embodiment, the present disclosure provides a method for the 5G network to use its own feature to support multicast routing.

Figure 5A:
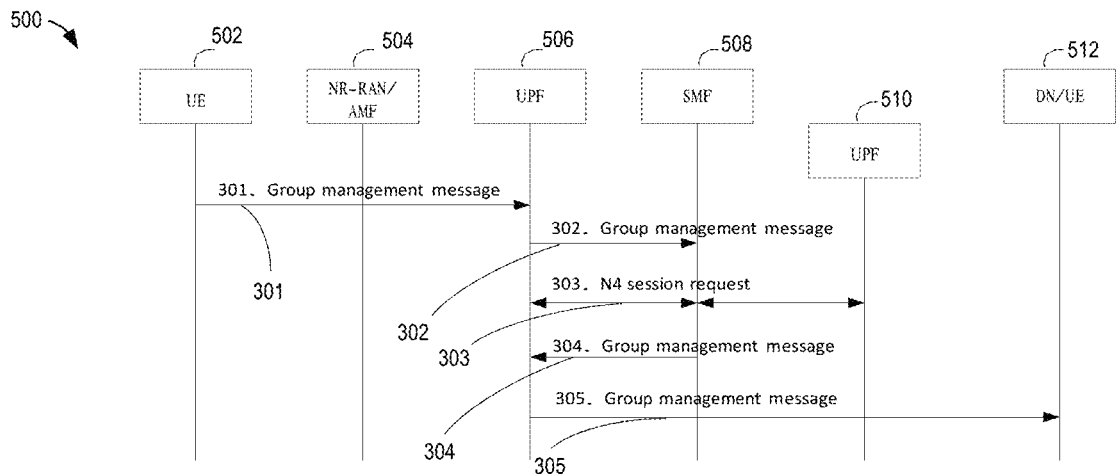
FIG. 5A illustrates a message sequence diagram depicting a different method of enabling one to many multicast operation in the 5G VN of FIG. 1, according to an embodiment in which the UE and DN are capable of handling Multicast group management protocol.

Referring now to FIG. 5A, a second embodiment of a method of enabling one to many multicast operation in the example 5G VN of FIG. 1 is illustrated. The various steps in the sequence diagram of FIG. 5A are:

At step 301, the UE 502 sends the Group Management Protocol message 621 (e.g join message, or leave message) in the PDU session. The message indicate the multicast address that the UE want to join or leave.

At step 302, the UPF detects the Group Management Protocol message 623 from UE 502 and sends it to SMF 508.

At step 303, the SMF 508 calculates the multicast group topology (i.e., SMF 508 figures out all the involved UPFs 510) and configures the involved UPFs 510 with related PDR and FAR. The involved UPF(s) 510 includes all the UPF which is involved in the related multicast group data forwarding.

At step 304, the SMF 508 send the Group Management Protocol message 629 to UPF 506.

At step 305, the UPF 506 send the Group Management Protocol message to DN (data network) and/or UE 512.

Figure 5B:
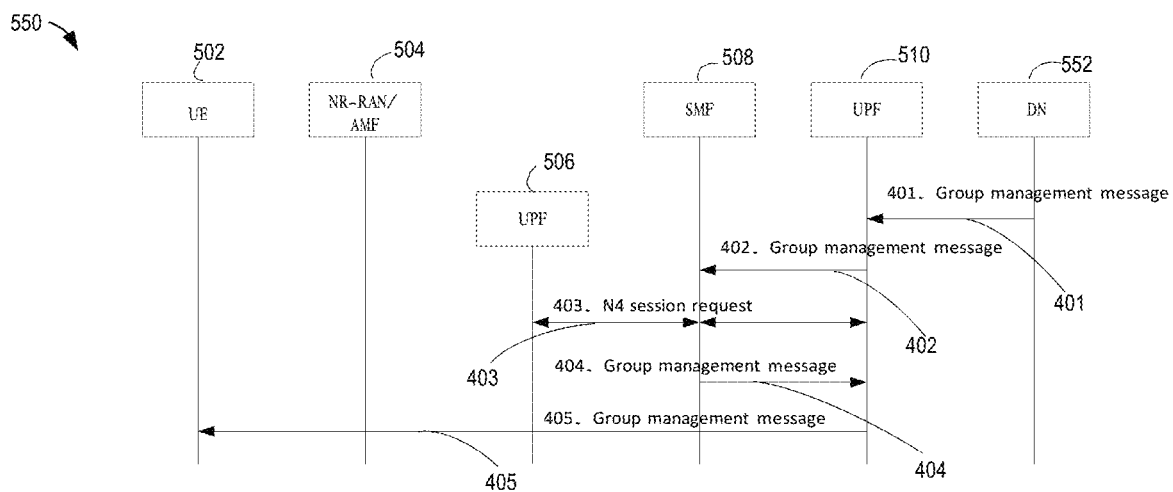
FIG. 5B depicts a message sequence diagram about the interactions between various components of the 5G Core network to detect the group management message and enable one to many multicast communication, according to an example embodiment.

Referring now to FIG. 5B, a message sequence diagram about the interactions between various components of the 5G Core network to detect the group management message and enable one to many multicast communication is depicted, the individual steps in the method being:

At step 401, the UPF 610 receives the Group Management Protocol message from DN 652.

At step 402, the UPF 610 detects the Group Management Protocol message from DN 652 and sends it to SMF 608.

At step 403, the SMF 608 calculates the multicast group topology (i.e., SMF 608 figures out all the involved UPFs 606) and configures the involved UPFs 606 with related PDR and FAR. The involved UPF(s) includes all the UPF which is involved in the related multicast group data forwarding.

At step 404, the SMF 608 sends the Group Management Protocol message to UPF 606.

At step 405, the UPF 606 sends the Group Management Protocol message to UE 602.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the disclosure is not restricted to the illustrated example architectures or configurations, but is implemented using a variety of alternative architectures and configurations. Additionally, as would be understood by persons of ordinary skill in the art, one or more features of one embodiment is combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations is used herein as a convenient means of distinguishing between two or more elements or instances of an element. Thus, a reference to first and second elements does not mean that only two elements is employed, or that the first element must precede the second element in some manner.

Additionally, a person having ordinary skill in the art would understand that information and signals is represented using any of a variety of different technologies and techniques.

A person of ordinary skill in the art would further appreciate that any of the various illustrative logical blocks, modules, processors, means, circuits, methods and functions described in connection with the aspects disclosed herein is implemented by electronic hardware (e.g., a digital implementation, an analog implementation, or a combination of the two), firmware, various forms of program or design code incorporating instructions (which is referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein is implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor is a microprocessor, but in the alternative, the processor is any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions is stored as one or more instructions or code on a computer-readable medium. Thus, the steps of a method or algorithm disclosed herein is implemented as software stored on a computer-readable medium. Computer-readable media includes both computer storage media and communication media including any medium that is enabled to transfer a computer program or code from one place to another. A storage media is any available media that is accessed by a computer. By way of example, and not limitation, such computer-readable media can include RAM, ROM, EEPROM, CD-ROM or other optical disk storage, magnetic disk storage or other magnetic storage devices, or any other medium that is used to store desired program code in the form of instructions or data structures and that is accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein is applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method to enable multicast operation in a wireless network, comprising:
    querying, by a first wireless communication node, a second wireless communication node to receive group member information;
    receiving, by the first wireless communication node, the group member information from the second wireless communication node, the group member information including multicast group member information, wherein the multicast group member information includes one or more identities of one or more user equipment (UEs) and a multicast address associated with the one or more UEs belonging to a virtual network (VN) group; and
    configuring, by the first wireless communication node, each of a subset of a plurality of third wireless communication nodes serving as protocol data unit (PDU) session anchors to the one or more UEs belonging to the multicast group member information of the VN group, with rules for forwarding multicast packets via at least one interface among the subset of the plurality of third wireless communication nodes to enable one to many multicast communication, wherein the subset of the plurality of third wireless communication nodes is determined according to the PDU session anchors of the one or more UEs corresponding to the multicast address.

2. The wireless communication method of claim 1, wherein querying by the first wireless communication node is by means of subscribing to the second wireless communication node.

3. The wireless communication method of claim 1, wherein querying by the first wireless communication node is by means of sending a request message to the second wireless communication node.

4. The wireless communication method of claim 1, wherein the first wireless communication node is a Session Management Function (SMF), the second wireless communication node is a Unified Data Management (UDM) or a Policy Control Function (PCF), and the plurality of third wireless communication nodes include a User Plane Function (UPF).

5. The wireless communication method of claim 1, wherein the multicast group member information further comprises a 5G VN group identifier (ID).

6. The wireless communication method of claim 1, wherein the rules include a packet detection rule (PDR) and a forwarding action rule (FAR).

7. The wireless communication method of claim 1, further comprising:
retrieving, by the second wireless communication node, the multicast group member information from a data repository.

8. The wireless communication method of claim 7, further comprising:
forwarding, by the second wireless communication node, the multicast group member information to the first wireless communication node.

9. The wireless communication method of claim 8, wherein the data repository comprises a Unified Data Repository (UDR).

10. A first wireless communication node, comprising:
at least one processor configured to:
query a second wireless communication node to receive group member information;
receive, via a receiver, the group member information from the second wireless communication node, the group member information including multicast group member information, wherein the multicast group member information includes one or more identities of one or more user equipment (UEs) and a multicast address associated with the one or more UEs belonging to a virtual network (VN) group; and
configure each of a subset of a plurality of third wireless communication nodes serving as protocol data unit (PDU) session anchors to the one or more UEs belonging to the multicast group member information of the VN group, with rules for forwarding multicast packets via at least one interface among the subset of the plurality of third wireless communication nodes to enable one to many multicast communication, wherein the subset of the plurality of third wireless communication nodes is determined according to the PDU session anchors of one or more UEs corresponding to the multicast address.

11. The first wireless communication node of claim 10, wherein the at least one processor is configured to query the second wireless communication node by means of subscribing to the second wireless communication node.

12. The first wireless communication node of claim 10, wherein the at least one processor is configured to query the second wireless communication node by means of sending a request message to the second wireless communication node.

13. The first wireless communication node of claim 10, wherein the first wireless communication node is a Session Management Function (SMF), the second wireless communication node is a Unified Data Management (UDM) or a Policy Control Function (PCF), and the plurality of third wireless communication nodes include a User Plane Function (UPF).

14. The first wireless communication node of claim 10, wherein the multicast group member information further comprises a 5G VN group identifier (ID).

15. The first wireless communication node of claim 10, wherein the rules include a packet detection rule (PDR) and a forwarding action rule (FAR).

16. The first wireless communication node of claim 10, wherein the at least one processor is configured to retrieve the multicast group member information from a data repository.

17. The first wireless communication node of claim 16, wherein the at least one processor is configured to forward the multicast group member information to the first wireless communication node.

18. The first wireless communication node of claim 17, wherein the data repository comprises a Unified Data Repository (UDR).

19. A wireless communication method to enable multicast operation in a wireless network, comprising:
receiving, by a second wireless communication node, a query from a first wireless communication node for group member information; and
sending, by the second wireless communication node, the group member information to the first wireless communication node, the group member information including multicast group member information, wherein the multicast group member information includes one or more identities of one or more user equipment (UEs) and a multicast address associated with the one or more UEs belonging to a virtual network (VN) group,
wherein each of a subset of a plurality of third wireless communication nodes serving as protocol data unit (PDU) session anchors to the one or more UEs belonging to the multicast group member information of the VN group is configured with rules for forwarding multicast packets via at least one interface among the subset of the plurality of third wireless communication nodes to enable one to many multicast communication, wherein the subset of the third wireless communication nodes is determined according to the PDU session anchors of the one or more UEs corresponding to the multicast address.

20. The wireless communication method of claim 19, wherein the first wireless communication node is a Session Management Function (SMF), the second wireless communication node is a Unified Data Management (UDM) or a Policy Control Function (PCF), and the plurality of third wireless communication nodes include a User Plane Function (UPF).

* * * * *